(12) United States Patent
Ashwood Smith

(10) Patent No.: US 7,296,087 B1
(45) Date of Patent: Nov. 13, 2007

(54) DYNAMIC ALLOCATION OF SHARED NETWORK RESOURCES BETWEEN CONNECTION-ORIENTED AND CONNECTIONLESS TRAFFIC

(75) Inventor: Peter J. Ashwood Smith, Hull (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/527,584

(22) Filed: Mar. 17, 2000

(51) Int. Cl.
*G06F 15/173* (2006.01)

(52) U.S. Cl. .................... 709/238; 709/226; 709/229; 709/235; 709/242

(58) Field of Classification Search ........ 370/229–240; 709/241
See application file for complete search history.

(56) References Cited

U.S. PATENT DOCUMENTS 6,363,053 B1 * 3/2002 Schuster et al. ............ 370/230
6,363,319 B1 * 3/2002 Hsu ............................ 701/202
6,473,404 B1 * 10/2002 Kaplan et al. .............. 370/238

OTHER PUBLICATIONS

RFC2702: Requirements for Traffic Engineering Over MPLS (D. Awduche; J. Malcolm; J. Agogbua; M. O'Dell; and J. McManus—Sep. 1999.

* cited by examiner

*Primary Examiner*—Syed A. Zia
(74) *Attorney, Agent, or Firm*—Matthew M. Roy; Ogilvy Renault LLP

(57) ABSTRACT

Resources of a shared physical network element of a communications network are dynamically allocated between connection-oriented traffic and connectionless traffic. For each shared physical network element of the network, a resource requirement of the connection-oriented traffic is determined; and a respective traffic metric to be used for routing connectionless traffic is dynamically adjusted based on the determined resource requirement of the connection-oriented traffic. As a result, resources of the shared physical network element can be efficiently utilized, and congestion of connectionless traffic being routed through the shared physical network element is avoided.

30 Claims, 2 Drawing Sheets

DYNAMIC ALLOCATION OF SHARED NETWORK RESOURCES BETWEEN CONNECTION-ORIENTED AND CONNECTIONLESS TRAFFIC

CROSS-REFERENCE TO RELATED APPLICATIONS

This is the first application filed for the present invention.

MICROFICHE APPENDIX

Not Applicable.

TECHNICAL FIELD

The present invention relates to resource management in communications networks, and in particular to dynamic allocation of shared network resources between connection-oriented and connectionless traffic in a communications network.

BACKGROUND OF THE INVENTION

In the modern network space, packetized data traffic of various different protocols (e.g. internet protocol, frame relay, asynchronous transfer mode, etc.) is transported over a common network infrastructure. Each protocol provides its own packet (or frame) size and format standards. Additionally, some protocols (e.g. IP) are specifically designed to allow packets having widely varying lengths. New routing protocols, for example the multi-protocol label switching (MPLS) protocol have been proposed to facilitate multi-protocol traffic across a common network infrastructure.

Under the MPLS protocol, label switched paths (LSPs) are propagated across the network hop-by-hop along a path that is set up at the beginning of a communications session. In a general, the label assigned to the LSP can be different for each hop, with the label conversion being performed by the node serving the respective hop. Resources of each hop (i.e. the node serving the hop) of the path are reserved during set-up of the path, and normally will not be available for carrying other traffic until the path is released.

The mapping of an end-to-end path at the beginning of a communications session characterizes the MPLS protocol as "connection oriented". Other protocols, (such as IP) which do not transport data over predefined end-to-end paths are referred to as "connectionless". Typically, connectionless traffic is routed across a network using a shortest-path or least-cost-path routing protocol, such as, for example, the Interior Gateway Protocol (IGP). In general, a metric (e.g. a link distance vector, or a link cost factor) is assigned to each link and used within each router for mapping packet destination addresses to downstream links. The metric is normally provisioned for traffic engineering, and reflects not only geographic distances, but also provisioned bandwidth of each link. A higher metric on a particular link makes that link less attractive for carrying connectionless traffic, so that the IGP will normally operate to route connectionless traffic away from that link. Both connection-oriented and connectionless traffic may be carried over shared network infrastructure. This situation is normally accommodated by adjusting the provisioned IGP metric to reflect an average anticipated amount of bandwidth allocated to the connection-oriented traffic. However, this raises a difficulty in that the amount of resources (e.g. bandwidth) actually available for use by connectionless traffic, on any link, will vary with the resources reserved for connection-oriented traffic. Accordingly, during periods of heavy demand for connection-oriented traffic, the provisioned IGP metric for a link may provide an inflated indication of the amount of bandwidth actually available for connectionless traffic. This can easily result in undesirable congestion on the link. Conversely, during periods of low demand for connection-oriented traffic, the provisioned IGP metric for a link may provide a deflated indication of the amount of band-width actually available for connectionless traffic. This can result in undesirable under-utilization of the link.

A technique which allows connection-oriented and connectionless traffic to efficiently share network resources is therefore highly desirable.

SUMMARY OF THE INVENTION

An object of the present invention is to provide a technique for efficiently allocating resources of a shared network element between connection oriented and connectionless traffic.

A further object of the present invention is to provide a method of allocating resources between connection oriented and connectionless traffic, by adjusting an IGP metric in accordance with MPLS resource reservations.

Accordingly, an aspect of the present invention provides a shared network element operative within a communications network capable of end-to-end transport of connection-oriented traffic and connectionless traffic through the shared network element. The shared network element comprises: means for determining a resource requirement of the connection-oriented traffic; and means for dynamically adjusting a respective traffic metric to be used for routing connectionless traffic based on the determined resource requirement of the connection-oriented traffic.

Another aspect of the present invention provides a method of managing an allocation of resources between connection-oriented traffic and connectionless traffic being routed through a shared physical network element of a communications network. The method comprises the steps of: determining a resource requirement of the connection-oriented traffic; and dynamically adjusting a respective traffic metric to be used for routing connectionless traffic based on the determined resource requirement of the connection-oriented traffic.

In embodiments of the invention, the connection-oriented traffic is multi-protocol label switched (MPLS) traffic. In such cases, the step of determining the resource requirement of the connection-oriented traffic comprises the steps of: receiving MPLS reservation requests in respect of the shared physical network element; and dynamically adjusting a total amount of resources required to satisfy the received MPLS reservation requests.

In embodiments of the invention, the connectionless traffic includes internet protocol (IP) packet traffic. In such cases, routing of the connectionless traffic may be controlled using an interior gateway protocol (IGP) routing system adapted to calculate a shortest path route of the connectionless traffic through the communications network, the shortest path routing being based on a respective metric concerning each physical network element forming the network.

The step of dynamically adjusting the respective metric preferably comprises the steps of: increasing the respective metric as the determined resource requirement of the connection-oriented traffic increases; and decreasing the respective metric as the determined resource requirement of the connection-oriented traffic decreases.

In some embodiments of the invention, the respective metric may be a link distance vector associated with a respective link connected to a node of the communications network. In such cases, the step of dynamically adjusting the respective metric comprises the steps of: determining an updated value of the link distance vector; and updating a mapping table maintained by the node with the updated value of the link distance vector.

An updated value of the link distance vector may be determined by querying a resource allocation table comprising a plurality of characteristic resource allocation values and a respective link distance vector value corresponding to each characteristic resource allocation value. Querying the resource allocation table may include the steps of: identifying the characteristic resource allocation value which most closely matches the determined resource requirement of the connection-oriented traffic; and selecting the corresponding link distance vector as the updated link cost factor.

In other embodiments of the invention, the respective metric may be a link cost factor associated with a respective link connected to a node of the communications network. In such cases, the step of dynamically adjusting the respective metric comprises the steps of: determining an updated value of the link cost factor; updating a PATH database maintained by the node with the updated link cost factor value; and propagating a link state packet containing the updated link cost factor value to neighboring nodes within the network.

An updated value of the link cost factor can be determined by querying a resource allocation table comprising a plurality of characteristic resource allocation values and a respective link cost factor value corresponding to each characteristic resource allocation value. Querying the resource allocation table may comprise the steps of: identifying the characteristic resource allocation value which most closely matches the determined resource requirement of the connection-oriented traffic; and selecting the corresponding link cost factor as the updated link cost factor.

An advantage of the present invention is that by adjusting the IGP metric for a link in accordance with changing resource requirements of connection oriented traffic, routing of connectionless traffic is automatically altered to make effective use of remaining resources while avoiding congestion. No modification of conventional (e.g. IGP) routing methodologies are required to accomplish this result.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
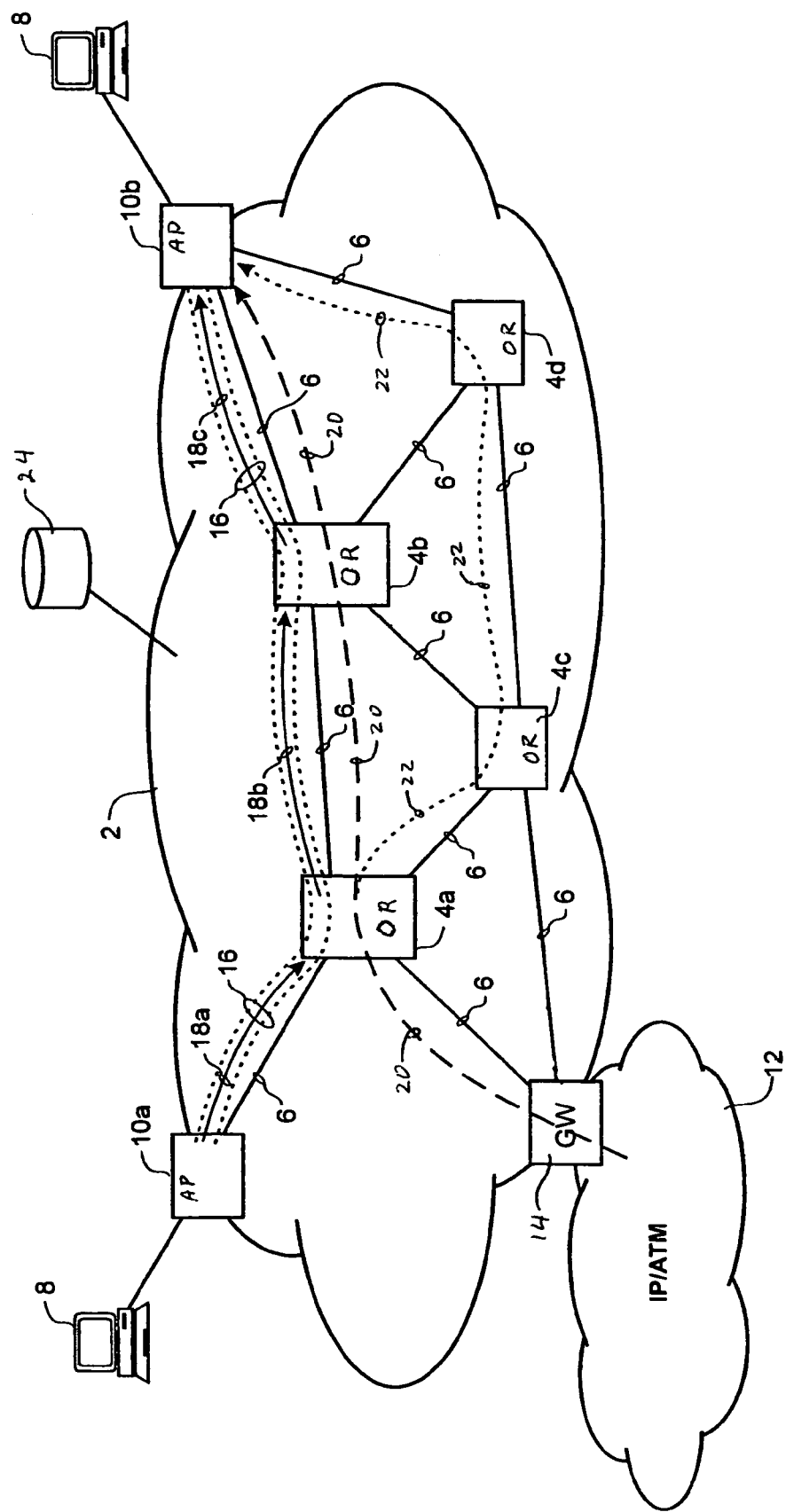
FIG. 1 is a block diagram illustrating a communications network usable in conjunction with an embodiment of the present invention.

The present invention provides a system for allocating resources between connectionless and connection-oriented traffic through a communications network. As shown in FIG. 1, a communications network 2 usable in conjunction with the present invention generally comprises a plurality of routers 4 (four are shown in FIG. 1) interconnected by links 6. The links 6 may be fiber optic links. The routers 4 may be agile or non-agile optical routers, and may be configured for wave division multiplex (WDM) and/or dense wave division multiplex (DWDM) transport of packet data traffic. Communications devices 8, for example end user personal computers (PCs) or local area network (LAN) servers may be connected to the communications network 2 via one or more access points 10. The communications network 2 may also be connected to one or more federated networks 12, for example an ATM or an IP network, through a respective gateway 14.

In the example of FIG. 1, connection-oriented traffic is conveyed through an end-to-end MPLS path 16 mapped across the communications network 2 between a source node and a destination node via one or more intervening routers 4. The path 16 is divided into hops 18, each of which is served a respective node (e.g. the source node or a router 4) connected at the up-stream end of the respective hop 18. In the illustrated example, the source and destination nodes are located at respective access points 10a and 10b, and two intervening routers 4a and 4b are incorporated into the path 16. A first hop 18a of the path 16 extends between the source node at access point 10a and a first router 4a. A second hop 18b extends between the routers 4a and 4b. Finally, a third hop 18c extends between the router 4b and the destination node at access point 10b.

In addition, connectionless traffic is transported through the communications network between the gateway 14 and the destination node 10b. Routing of the connectionless traffic is handled, for example, in accordance with conventional least cost path routing using the Interior Gateway Protocol (IGP) to map destination addresses to downstream links. In the example illustrated in FIG. 1, a least cost path 20 calculated using provisioned IGP metrics for each link follows the route indicated by dashed arrows. As may be seen in FIG. 1, this least cost path 20 shares two hops (18b and 18c) with the MPLS path 16, which may lead to congestion on those hops. Thus the present invention provides a technique of managing the allocation of resources between the two traffic flows, in order to avoid congestion within the shared hops.

In accordance with the present invention, congestion within shared physical elements of the network (e.g. within the routers 4a, 4b and links 6 of the shared hops 18b, 18c) is avoided by adjusting the IGP metrics concerning each of the shared links 6 to reflect the resources (e.g. bandwidth) which have been allocated to the MPLS path 16. Adjustment of the IGP metric in this manner makes each of the shared links 6 less attractive for either shortest-distance-path routing or least-cost-path routing. In cases where either the bandwidth allocated to the MPLS path 16, or the volume of connectionless traffic is large, the adjusted IGP metrics on the shared links 6 may cause the routing protocol to favour an alternative path 22 (indicated by dotted arrows in FIG. 1) which avoids sharing links 6 with the MPLS path 16.

Adjustment of IGP metrics can be based on a resource allocation table 24 which may be co-resident within each router 4 or centrally located and accessible by each router 4 through the network 2. The resource allocation table 24 generally operates to receive a query from a node (any of access points 10, routers 4, or gateway 14) containing a value indicative of resources allocated to connection oriented traffic (in the present example bandwidth allocated to the MPLS path 16). The resource allocation table 24 returns a response message to the node containing an updated value of an IGP metric. The node can then update its local path database (not shown) and propagate a link state packet to neighbouring nodes of the network so that conventional IGP routing can proceed on the basis of the updated IGP metric. Exemplary steps in a process of adjusting the IGP metric for a link 6 connected to a router 4 within the network 2 are described below with respect to FIG. 2.

Figure 2:
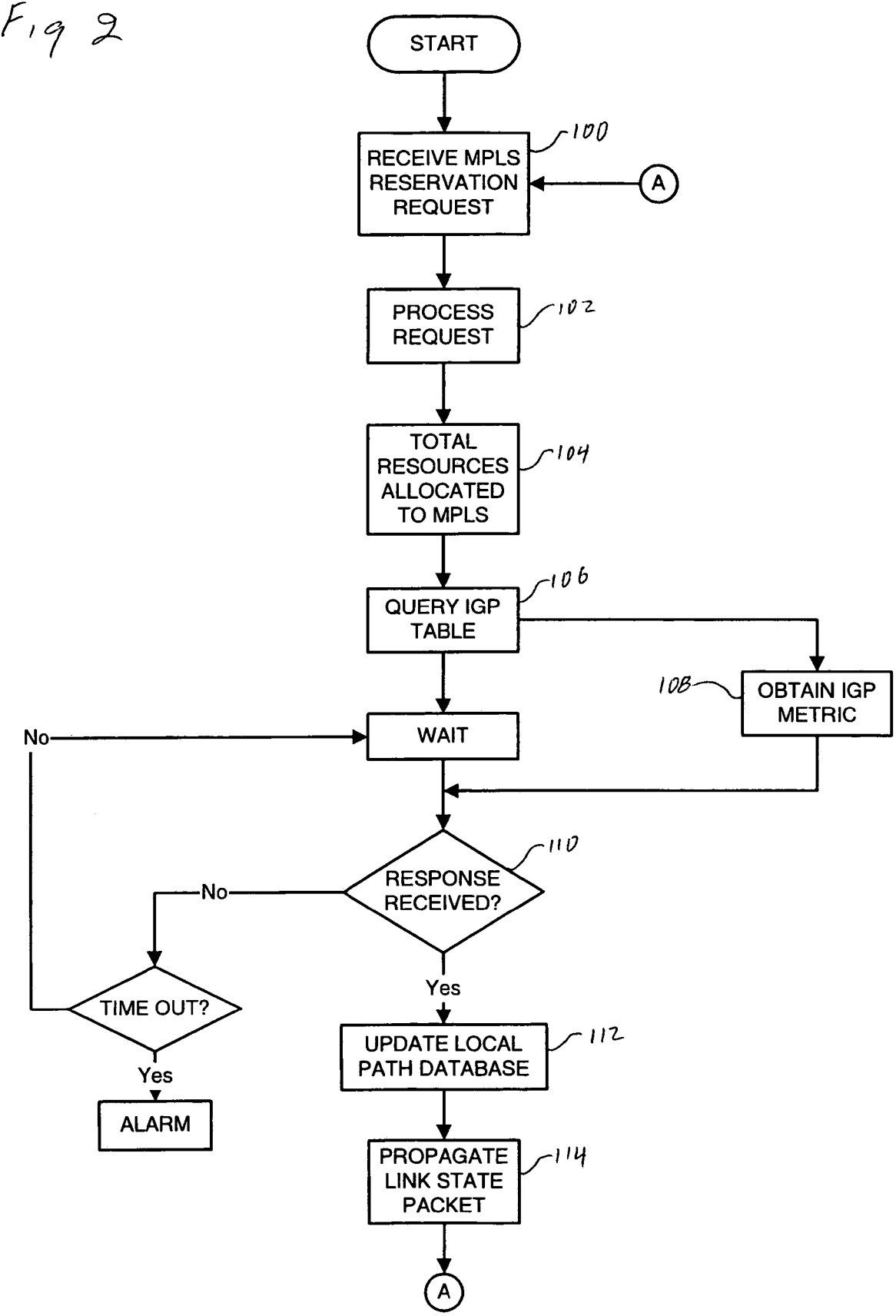
FIG. 2 is a flow chart illustrating exemplary steps in a process for managing resource allocation in accordance with an embodiment of the present invention.

Adjustment of IGP metrics for each link 6 is preferably performed by the associated node during the set up of an MPLS path 16 through that node. Accordingly, as shown in FIG. 2, when an MPLS reservation request is received at a node (step 100), the request is processed in a conventional manner (step 102) and resources of the node (and a downstream link) are allocated to a hop of an MPLS path 16 being set up across the communications network 2. Once resources have been allocated to the MPLS path 16, the node operates to determine a total resource allocation to connection oriented traffic over the involved downstream link 6 (step 104). The node then formulates a query message containing the total amount of allocated resources (step 106) and forwards the query message to the resource allocation table 24. Upon receipt of the query message from the node, the resource allocation table 24 determines an adjusted IGP metric value (step 108) and sends a response message to the node containing the adjusted IGP metric value. If the response message is received by the node prior to expiry of a predetermined time out period (step 110), the node operates to update its local path database with the adjusted IGP metric value for the downstream link involved in the newly set up MPLS path 16 (step 112). This change in the local path database of the node automatically triggers the generation of a link state packet which is propagated to neighbouring nodes within the network for handling in a conventional manner (step 114).

While not shown in the drawings, it will be appreciated that an analogous process may be executed within a node to adjust the IGP metric as resources allocated to connection oriented traffic are released (e.g. as an MPLS path is taken down). Thus when an MPLS path release message is received at a node, the message is processed in a conventional manner, and resources of the node (and a downstream link) allocated to a hop of an MPLS path across the communications network are released. Once resources have been released, the node operates to determine a total amount of resources allocated to connection oriented traffic over the involved downstream link. The node then formulates a query message containing the total resource allocation, and forwards the query message to the resource allocation table. Upon receipt of the query message from the node, the resource allocation table determines an adjusted IGP metric value and sends a response message to the node containing the adjusted IGP metric value. If the response message is received by the node prior to a predetermined time out period, the node operates to update its local path database with the adjusted IGP metric value for the downstream link involved in the recently released MPLS path. This change in the local path database of the node automatically triggers the generation of a link state packet which is propagated to neighbouring nodes within the network for handling in a normal manner Various techniques may be used within the resource allocation table 24 to determine adjusted values for the IGP metric. For example, the resource allocation table 24 may contain a list of characteristic resource allocation values, and corresponding IGP metric values. In this case, upon receipt of a query message from a node, the resource allocation is extracted from the query message and compared to the characteristic values in the resource allocation table 24. The IGP metric value corresponding to the characteristic value which most closely matches the resource allocation extracted from the query message is then selected as the adjusted IGP metric, and sent back to the node in the response message. In an alternative embodiment, and in order to accommodate differing bandwidth capacities of links within the network, at least the characteristic resource allocation values within the resource allocation table 24 may be proportional, and so may represent a fraction of the total available bandwidth that has been allocated to connection-oriented traffic.

The embodiment(s) of the invention described above is(are) intended to be exemplary only. The scope of the invention is therefore intended to be limited solely by the scope of the appended claims.

I claim:

1. A method of managing a logical allocation of resources between connection-oriented traffic and connectionless traffic being routed through a shared physical network element of a communications network, the method comprising the steps of:
   a) determining a resource requirement of the connection-oriented traffic;
   b) dynamically adjusting a respective traffic metric to be used for routing connectionless traffic based on the determined resource requirement of the connection-oriented traffic; and
   c) routing the connectionless traffic based on the adjusted traffic metric, thereby providing the logical allocation of resources for connectionless traffic based on the resource requirement of connection-oriented traffic.

2. A method as claimed in claim 1, wherein the connection-oriented traffic comprises multi-protocol label switched (MPLS) traffic.

3. A method as claimed in claim 2, wherein the step of determining the resource requirement of the connection-oriented traffic comprises the steps of:
   a) receiving MPLS reservation requests in respect of the shared physical network element; and
   b) dynamically adjusting a total amount of resources required to satisfy the received MPLS reservation requests.

4. A method as claimed in claim 1, wherein the connectionless traffic comprises internet protocol (IP) packet traffic.

5. A method as claimed in claim 4, wherein routing of the connectionless traffic is controlled using an interior gateway protocol (IP) routing system adapted to calculate a shortest path route of the connectionless traffic through the communications network, the shortest path routing being based on a respective metric of each physical network element forming the network.

6. A method as claimed in claim 5, wherein the step of dynamically adjusting the respective metric comprises the steps of:
   a) increasing the respective metric as the determined resource requirement of the connection-oriented traffic increases; and
   b) decreasing the respective metric as the determined resource requirement of the connection-oriented traffic decreases.

7. A method as claimed in claim 5, wherein the respective metric is a link distance vector associated with a respective link connected to a node of the communications network.

8. A method as claimed in claim 7, wherein the step of dynamically adjusting the respective metric comprises the steps of:
   a) determining an updated value of the link distance vector; and
   b) updating a mapping table maintained by the node with the updated value of the link distance vector.

9. A method as claimed in claim 8, wherein the step of determining an updated value of the link distance vector comprises a step of querying a resource allocation table comprising a plurality of characteristic resource allocation values and a respective link distance vector value corresponding to each characteristic resource allocation value.

10. A method as claimed in claim 9, wherein the step of querying the resource allocation table comprises the steps of:
   a) identifying the characteristic resource allocation value which most closely matches the determined resource requirement of the connection-oriented traffic; and
   b) selecting the corresponding link distance vector as the updated link cost factor.

11. A method as claimed in claim 5, wherein the respective metric is a link cost factor associated with a respective link connected to a node of the communications network.

12. A method as claimed in claim 10, wherein the step of dynamically adjusting the respective metric comprises the steps of:
   a) determining an updated value of the link cost factor;
   b) updating a PATH table maintained by the node with the updated link cost factor value; and
   c) propagating a link state packet containing the updated link cost factor value to neighboring nodes within the network.

13. A method as claimed in claim 12, wherein the step of determining an updated value of the link cost factor comprises a step of querying a resource allocation table comprising a plurality of characteristic resource allocation values and a respective link cost factor value corresponding to each characteristic resource allocation value.

14. A method as claimed in claim 13, wherein the step of querying the resource allocation table comprises the steps of:
   a) identifying the characteristic resource allocation value which most closely matches the determined resource requirement of the connection-oriented traffic; and
   b) selecting the corresponding link cost factor as the updated link cost factor.

15. A shared network element operative within a communications network capable of end-to-end transport of connection-oriented traffic and connectionless traffic through the shared network element, the shared network element comprising:
   a) means for determining a resource requirement of the connection-oriented traffic; and
   b) means for dynamically adjusting a respective traffic metric to be used for routing connectionless traffic based on the determined resource requirement of the connection-oriented traffic; and
   c) means for routing the connectionless traffic through the shared network element based on the adjusted traffic metric,
thereby providing a logical allocation of resources for connectionless traffic based on the resource requirement of connection-oriented traffic.

16. A shared network element as claimed in claim 15, wherein the connection-oriented traffic comprises multi-protocol label switched (MPLS) traffic.

17. A shared network element as claimed in claim 16, wherein the means for determining the resource requirement of the connection-oriented traffic comprises:
   a) means for receiving MPLS reservation requests in respect of the shared physical network element; and
   b) means for dynamically adjusting a total amount of resources required to satisfy the received MPLS reservation requests 18. A shared network element as claimed in claim 15, wherein the connectionless traffic comprises internet protocol (IP) packet traffic.

19. A shared network element as claimed in claim 18, wherein routing of the connectionless traffic is controlled using an interior gateway protocol (IGP) routing system adapted to calculate a shortest path route of the connectionless traffic through the communications network, the shortest path routing being based on a respective metric of each physical network element forming the network.

20. A shared network element as claimed in claim 19, wherein the means for dynamically adjusting the respective metric comprises means adapted to:
   a) increase the respective metric as the determined resource requirement of the connection-oriented traffic increases; and
   b) decrease the respective metric as the determined resource requirement of the connection-oriented traffic decreases.

21. A shared network element as claimed in claim 19, wherein the respective metric is a link distance vector associated with a respective link connected to a node of the communications network.

22. A shared network element as claimed in claim 21, wherein the means for dynamically adjusting the respective metric comprises:
   a) means for determining an updated value of the link distance vector; and
   b) means for updating a mapping table maintained by the shared network element with the updated value of the link distance vector.

23. A shared network element as claimed in claim 22, wherein the means for determining an updated value of the link distance vector comprises a resource allocation table comprising a plurality of characteristic resource allocation values and a respective link distance vector value corresponding to each characteristic resource allocation value.

24. A shared network element as claimed in claim 23, further comprising:
   a) means for identifying the characteristic resource allocation value which most closely matches the determined resource requirement of the connection-oriented traffic; and
   b) means for selecting the corresponding link distance vector as the updated link cost factor.

25. A shared network element as claimed in claim 19, wherein the respective metric is a link cost factor associated with a respective link connected to a node of the communications network.

26. A shared network element as claimed in claim 25, wherein the means for dynamically adjusting the respective metric comprises:
   a) means for determining an updated value of the link cost factor;
   b) means for updating a PATH table maintained by the node with the updated link cost factor value; and
   c) means for propagating a link state packet containing the updated link cost factor value to neighboring nodes within the network.

27. A shared network element as claimed in claim 26, wherein the means for determining an updated value of the link cost factor comprises a resource allocation table comprising a plurality of characteristic resource allocation values and a respective link cost factor value corresponding to each characteristic resource allocation value.

28. A shared network element as claimed in claim 27, further comprising:
    a) means for identifying the characteristic resource allocation value which most closely matches the determined resource requirement of the connection-oriented traffic; and
    b) means for selecting the corresponding link cost factor as the updated link cost factor.

29. A method of managing a logical allocation of resources between connection-oriented traffic and connectionless traffic being routed through a shared physical network element of a communications network, the method comprising the steps of:
    a) in response to a change in resources allocated to a multi-protocol label switched (MPLS) path through the shared physical network element, determining an updated total amount of resources of the shared physical network element allocated to connection-oriented traffic;
    b) dynamically adjusting a respective updated traffic metric of the shared physical network element based on the updated total resources allocated to the connection-oriented traffic; and
    c) routing the connectionless traffic based on the adjusted traffic metric.

30. A shared network element operative within a communications network capable of end-to-end transport of connection-oriented Fit and connectionless traffic through the shared network element, the shared network element comprising:
    a) means responsive to a change in resources allocated to a multi-protocol label switched (MPLS) path through the shared physical network element for determining an updated total amount of resources of the shared physical network element allocated to connection-oriented traffic;
    b) means for determining an updated traffic metric to be used for routing connectionless traffic based on the updated total resources allocated to the connection-oriented traffic; and
    c) means for routing the connectionless traffic based on the adjusted traffic metric.

* * * * *